(12) United States Patent
Miyachi et al.

(10) Patent No.: US 12,166,174 B2
(45) Date of Patent: Dec. 10, 2024

(54) NON-AQUEOUS ELECTROLYTE SECONDARY BATTERY

(71) Applicant: Prime Planet Energy & Solutions, Inc., Tokyo (JP)

(72) Inventors: Yoshikazu Miyachi, Kobe (JP); Kazunori Donoue, Kobe (JP); Shinya Miyazaki, Tokushima (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 320 days.

(21) Appl. No.: 17/542,507

(22) Filed: Dec. 6, 2021

(65) Prior Publication Data
US 2022/0181683 A1 Jun. 9, 2022

(30) Foreign Application Priority Data

Dec. 7, 2020 (JP) .................................. 2020-202512

(51) Int. Cl.
*H01M 10/0563* (2010.01)
*H01M 10/0525* (2010.01)
(Continued)

(52) U.S. Cl.
CPC ... *H01M 10/0563* (2013.01); *H01M 10/0525* (2013.01); *H01M 2004/021* (2013.01);
(Continued)

(58) Field of Classification Search
CPC ....................... H01M 10/0525; H01M 10/0563
See application file for complete search history.

(56) References Cited

U.S. PATENT DOCUMENTS

2012/0308881 A1 12/2012 Tokuda et al.
2013/0280622 A1* 10/2013 Tokuda ............. H01M 10/0525
429/339

(Continued)

FOREIGN PATENT DOCUMENTS

CN 103492319 A 1/2014
CN 105074994 A 11/2015
(Continued)

OTHER PUBLICATIONS

Engineers Edge, LLC. Capacity and Battery Ratings Review, Jan. 9, 2019—Engineers Edge, web.archive.org/web/20190120112742/https://www.engineersedge.com/battery/capacity_battery_ratings.htm (Year: 2019).*

(Continued)

*Primary Examiner* — James M Erwin
*Assistant Examiner* — Zackary Richard Cochenour
(74) *Attorney, Agent, or Firm* — HAUPTMAN HAM, LLP

(57) ABSTRACT

A non-aqueous electrolyte secondary battery satisfies a relationship of an expression (I) "$-0.19 \leq x-(0.0061y+0.0212z)$". $x$ [μmol/Ah] is a value obtained by dividing a total amount of substance of lithium fluorosulfonate included in the electrolyte solution, by the rated capacity. $y$ [m²/Ah] is a value obtained by dividing a product of a BET specific surface area of the positive electrode active material particles and the total mass of the positive electrode active material particles included in the positive electrode plate, by the rated capacity. $z$ [m²/Ah] is a value obtained by dividing a product of a BET specific surface area of the negative (Continued)

electrode active material particles and the total mass of the negative electrode active material particles included in the negative electrode plate, by the rated capacity.

2 Claims, 4 Drawing Sheets

(51) Int. Cl.
*H01M 4/02* (2006.01)
*H01M 4/505* (2010.01)
*H01M 4/525* (2010.01)
*H01M 4/587* (2010.01)
*H01M 4/62* (2006.01)

(52) U.S. Cl.
CPC ...... *H01M 2004/027* (2013.01); *H01M 4/505* (2013.01); *H01M 4/525* (2013.01); *H01M 4/587* (2013.01); *H01M 4/623* (2013.01); *H01M 4/625* (2013.01); *H01M 2220/20* (2013.01)

(56) References Cited

U.S. PATENT DOCUMENTS

| 2014/0038062 | A1 | 2/2014 | Kawakami et al. |
| 2016/0013517 | A1 | 1/2016 | Nakazawa et al. |
| 2019/0181453 | A1 | 6/2019 | Ishii et al. |

FOREIGN PATENT DOCUMENTS

| CN | 109904406 A | | 6/2019 | |
| JP | 2012094454 A | | 5/2012 | |
| JP | 2012230897 A | | 11/2012 | |
| JP | 2013152956 A | | 8/2013 | |
| JP | 2016106369 A | * | 6/2016 | ........... C01B 17/463 |

OTHER PUBLICATIONS

"IPhone 15 Battery: How Apple's New Model Compares to Competitors." Batteryfactor.Com, Nov. 20, 2023, batteryfactor.com/battery-factor-blog/iphone-15-battery/ (Year: 2023).*
Machine Translation of JP-2016106369-A (Year: 2016).*

* cited by examiner

NON-AQUEOUS ELECTROLYTE SECONDARY BATTERY

This nonprovisional application is based on Japanese Patent Application No. 2020-202512 filed on Dec. 7, 2020, with the Japan Patent Office, the entire contents of which are hereby incorporated by reference.

BACKGROUND OF THE INVENTION

Field of the Invention

The present technique relates to a non-aqueous electrolyte secondary battery.

Description of the Background Art

Japanese Patent Laying-Open No. 2013-152956 discloses a non-aqueous electrolyte solution containing fluorosulfonate.

SUMMARY OF THE INVENTION

Addition of lithium fluorosulfonate ($FSO_3Li$) to an electrolyte solution of a non-aqueous electrolyte secondary battery (which may also be abbreviated as "battery" hereinafter) is suggested. Addition of $FSO_3Li$ is expected to improve capacity retention after high-temperature storage. It may be because $FSO_3Li$ forms a film on a surface of a negative electrode active material particle and, thereby, degradation of the negative electrode active material particle during high-temperature storage is reduced.

However, $FSO_3Li$ in the electrolyte solution may be distributed not only to a negative electrode plate but also to a positive electrode plate. Therefore, there is a possibility that the amount of $FSO_3Li$ distributed to the negative electrode plate may not be sufficient.

An object of the technique according to the present application (herein also called "the present technique") is to improve post-high-temperature-storage capacity retention.

Hereinafter, the configuration and effects of the present technique will be described. It should be noted that the action mechanism according to the present technique includes presumption. The scope of the present technique should not be limited by whether or not the action mechanism is correct.

[1] A non-aqueous electrolyte secondary battery has a rated capacity. The non-aqueous electrolyte secondary battery comprises a positive electrode plate, a negative electrode plate, and an electrolyte solution. The positive electrode plate includes positive electrode active material particles. The negative electrode plate includes negative electrode active material particles. The negative electrode active material particles have an average circularity more than 0.7. The electrolyte solution includes lithium fluorosulfonate.

The non-aqueous electrolyte secondary battery satisfies a relationship of the following expression (I):

$$-0.19 \leq x - (0.0061y + 0.0212z) \quad (I)$$

where $x$ [$\mu$mol/Ah] is a value obtained by dividing a total amount of substance of lithium fluorosulfonate included in the electrolyte solution, by the rated capacity;

$y$ [m$^2$/Ah] is a value obtained by dividing a product of a BET specific surface area of the positive electrode active material particles and the total mass of the positive electrode active material particles included in the positive electrode plate, by the rated capacity; and $z$ [m$^2$/Ah] is a value obtained by dividing a product of a BET specific surface area of the negative electrode active material particles and the total mass of the negative electrode active material particles included in the negative electrode plate, by the rated capacity.

The following describes how the present technique has been developed.

In a battery including an electrolyte solution to which an excess amount of $FSO_3Li$ was added, the amount of $FSO_3Li$ distributed to each electrode plate was checked, in the below manner. The battery, after initial charging and discharging, was disassembled, and the positive electrode plate and the negative electrode plate were collected. By ICP-AES (Inductively Coupled Plasma Atomic Emission Spectroscopy), the molality (mol/g) of sulfur (S) in the positive electrode plate was measured. It seems that sulfur is a component derived from $FSO_3Li$. The resulting sulfur molality (mol/g) was divided by the BET specific surface area of the positive electrode active material particles (m$^2$/g) to calculate the amount of substance of sulfur per unit surface area (mol/m$^2$). The amount of substance of sulfur per unit surface area of the positive electrode plate was 0.0061 mol/m$^2$. Hereinafter, this value is also called "a first coefficient".

In the same manner, for the negative electrode plate, the amount of substance of sulfur per unit surface area (mol/m$^2$) was calculated. The amount of substance of sulfur per unit surface area of the negative electrode plate was 0.0212 mol/m$^2$. Hereinafter, this value is also called "a second coefficient".

According to new findings from the present technique, the ratio between the first coefficient and the second coefficient may be substantially constant regardless of the size and shape of the electrode plates.

The product of the BET specific surface area of the positive electrode plate and the first coefficient seems to mean the amount of $FSO_3Li$ distributed to the positive electrode plate. The product of the BET specific surface area of the negative electrode plate and the second coefficient seems to mean the amount of $FSO_3Li$ distributed to the negative electrode plate. For example, when the total amount of substance of $FSO_3Li$ in the initial electrolyte solution is higher than the total amount distributed to both electrode plates, it is expected that $FSO_3Li$ is distributed across the entire negative electrode plate.

In the present technique, the amount of $FSO_3Li$ added to the electrolyte solution (the initial content) is normalized by the rated capacity of the battery. The amount distributed to each electrode plate is also normalized by the rated capacity of the battery. By this, the right side of the above expression (I) is obtained. Hereinafter, the value given by the calculation of the right side of the above expression (I) is also called "value A". It seems that the value A does not depend on the rated capacity of the battery. The sign and absolute value of the value A, for example, allow for judging whether $FSO_3Li$ is sufficient in the negative electrode plate.

It was found that the value A is not necessarily required to be zero or more. According to new findings from the present technique, when the value A is −0.19 or more, post-high-temperature-storage capacity retention tends to be high. That is, when the value A is −0.19 or more, it seems that a sufficient amount of $FSO_3Li$ is distributed to the negative electrode plate. It may be because some part of the surfaces of the negative electrode active material particles is not in contact with the electrolyte solution.

However, the average circularity of the negative electrode active material particles needs to be more than 0.7. When the average circularity of the negative electrode active material particles is 0.7 or less, distribution of the electrolyte solution may be nonuniform in a thickness direction of the negative electrode plate. Gaps between the negative electrode active material particles may serve as pores. It seems that the pores serve as a pathway for permeation of the electrolyte solution. The smaller the average circularity of the negative electrode active material particles is, the smaller the pores tend to be. It seems that, when the pores are small, permeation of the electrolyte solution is hindered, and distribution of the electrolyte solution becomes nonuniform in a thickness direction of the negative electrode plate. When the distribution of the electrolyte solution is nonuniform, $FSO_3Li$ may not be distributed across the entire negative electrode plate even when $FSO_3Li$ is sufficient. When the average circularity of the negative electrode active material particles is more than 0.7, the pores may be sufficiently large. By this, $FSO_3Li$ is expected to be distributed across the entire negative electrode plate.

[2] In the non-aqueous electrolyte secondary battery, a relationship of the following expression (II):

$$x-(0.0061y+0.0212z) \leq 0.58 \quad \text{(II)}$$

may be further satisfied.

When the value A is more than 0.58, DCIR (Direct Current Internal Resistance) can increase to a non-negligible extent. It may be because the excess $FSO_3Li$ forms a resistant component (such as a film, for example).

The foregoing and other objects, features, aspects and advantages of the present technique will become more apparent from the following detailed description of the present technique when taken in conjunction with the accompanying drawings.

DESCRIPTION OF THE PREFERRED EMBODIMENTS

Figure 1:
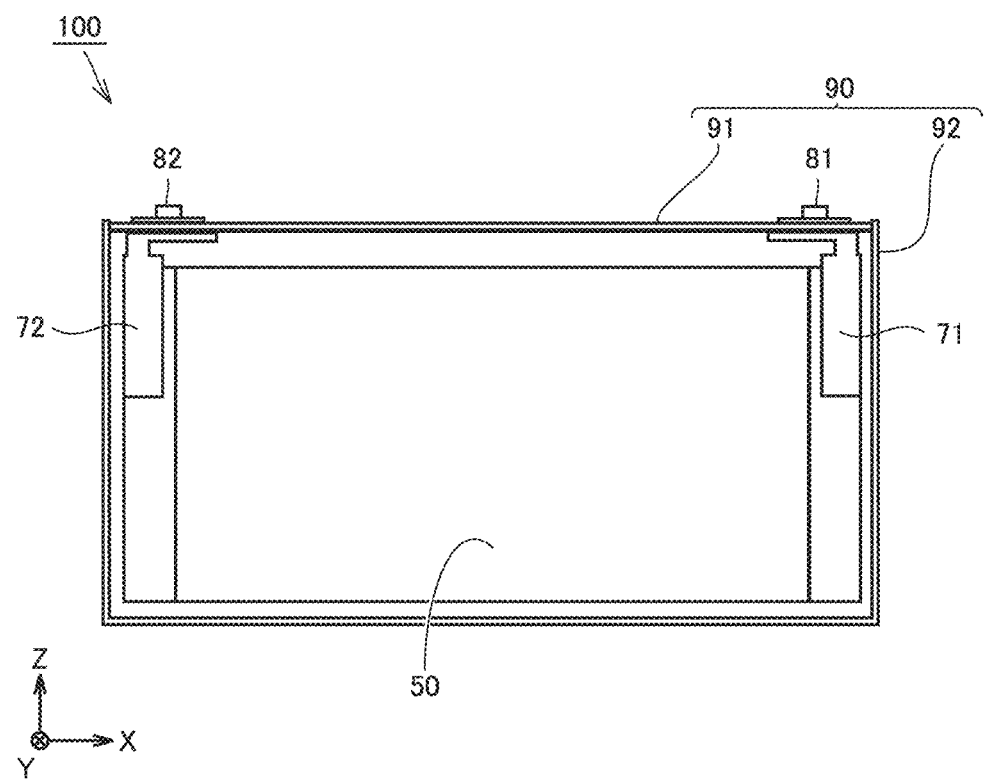
FIG. 1 is a schematic view illustrating an example of a non-aqueous electrolyte secondary battery according to the present embodiment.

Next, an embodiment of the present technique (also called "the present embodiment" hereinafter) will be described. It should be noted that the below description does not limit the scope of the present technique.

Expressions such as "comprise, include", "have", and variations thereof (such as "be composed of", "encompass, involve", "contain", "carry, support", and "hold", for example) herein are open-ended expressions. In other words, each of these expressions includes a certain configuration, but this configuration is not necessarily the only configuration that is included. The expression "consist of" is a closed-end expression. The expression "consist essentially of" is a semiclosed-end expression. In other words, the expression "consist essentially of" means that an additional component may also be included in addition to an essential component or components, unless an object of the present technique is impaired. For example, a component that is usually expected to be included in the relevant field to which the present technique pertains (such as inevitable impurities, for example) may be included as an additional component.

A singular form ("a", "an", and "the") herein also includes its plural meaning, unless otherwise specified. For example, "a particle" may include not only "a single particle" but also "a group of particles (particles, powder)".

In the present specification, when a compound is represented by a stoichiometric composition formula such as "$LiCoO_2$", this stoichiometric composition formula is merely a typical example. The composition ratio may be non-stoichiometric. For example, when lithium cobalt oxide is represented as "$LiCoO_2$", the composition ratio of lithium cobalt oxide is not limited to "Li/Co/O=1/1/2" but Li, Co, and O may be included in any composition ratio, unless otherwise specified.

A numerical range such as "from 0.72 to 1" herein includes both the upper limit and the lower limit, unless otherwise specified. For example, "from 0.72 to 1" means a numerical range of "not less than 0.72 and not more than 1". Moreover, any numerical value selected from the numerical range may be used as a new upper limit and/or a new lower limit. For example, any numerical value within the numerical range and any numerical value described in another location of the present specification may be combined to create a new numerical range.

The dimensional relationship in each figure may not necessarily coincide with the actual dimensional relationship. The dimensional relationship (in length, width, thickness, and the like) in each figure may have been changed for the purpose of assisting the understanding of the present technique. Further, a part of a configuration may have been omitted.

Any geometric term herein (such as "perpendicular", for example) should not be interpreted solely in its exact meaning. For example, "perpendicular" may mean a geometric state that is deviated, to some extent, from exact "perpendicular". Any geometric term herein may include tolerances and/or errors in terms of design, operation, production, and/or the like.

<Non-Aqueous Electrolyte Secondary Battery>

FIG. 1 is a schematic view illustrating an example of a non-aqueous electrolyte secondary battery according to the present embodiment.

A battery 100 may be used for any application. For example, battery 100 may be used as a main electric power supply or a motive force assisting electric power supply in an electric vehicle. A plurality of batteries 100 may be connected together to form a battery module or a battery pack.

Battery 100 has a predetermined rated capacity. For example, battery 100 may have a rated capacity from 1 Ah to 50 Ah. For example, battery 100 may have a rated capacity from 2 Ah to 25 Ah. For example, battery 100 may have a rated capacity from 3 Ah to 5 Ah. For example, battery 100 may have a rated capacity from 4 Ah to 4.2 Ah.

Battery 100 includes a housing 90. Housing 90 is prismatic (a flat, rectangular parallelepiped). However, prismatic is merely an example. Housing 90 may have any configuration. Housing 90 may be cylindrical or may be a pouch, for example. Housing 90 may be made of Al (aluminum) alloy, for example. Housing 90 accommodates an electrode assembly 50 and an electrolyte solution (not illustrated). Housing 90 may include a sealing plate 91 and an exterior can 92, for example. Sealing plate 91 closes an opening of exterior can 92. Sealing plate 91 and exterior can 92 may be bonded together by, for example, laser beam welding.

Sealing plate 91 is provided with a positive electrode terminal 81 and a negative electrode terminal 82. Sealing plate 91 may be further provided with an inlet and a gas-discharge valve. Through the inlet, the electrolyte solution may be injected into housing 90. Electrode assembly 50 is connected to positive electrode terminal 81 via a positive electrode current-collecting member 71. Positive electrode current-collecting member 71 may be an Al plate and/or the like, for example. Electrode assembly 50 is connected to negative electrode terminal 82 via a negative electrode current-collecting member 72. Negative electrode current-collecting member 72 may be a Cu (copper) plate and/or the like, for example.

Figure 2:
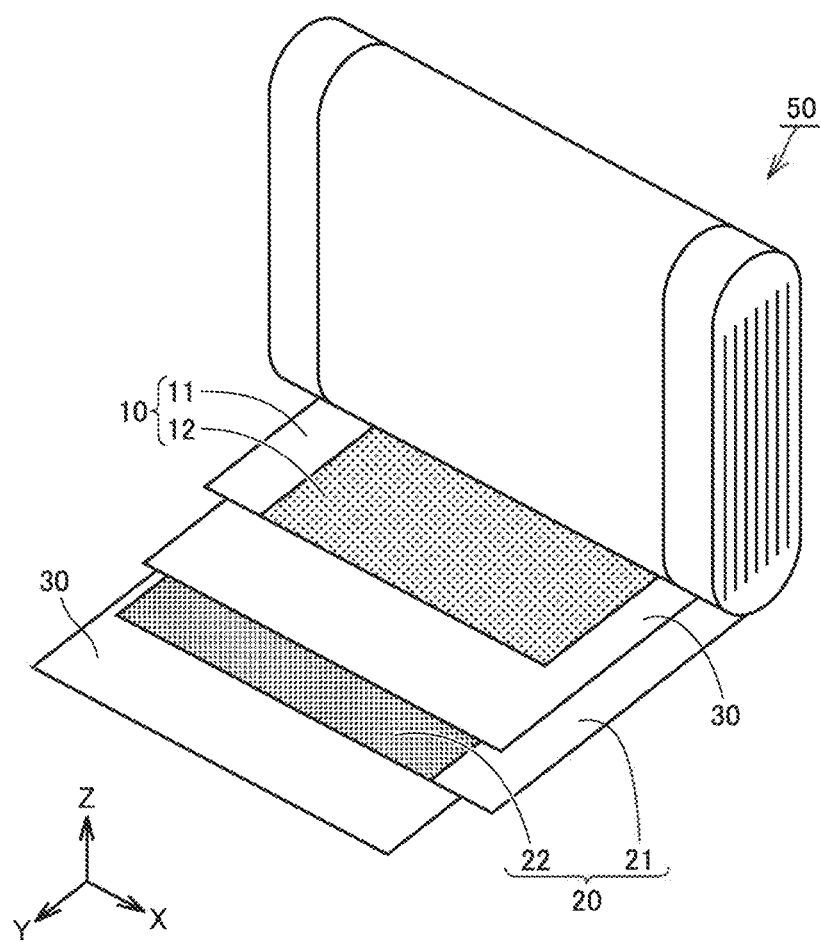
FIG. 2 is a schematic view illustrating an example of an electrode assembly according to the present embodiment.

FIG. 2 is a schematic view illustrating an example of an electrode assembly according to the present embodiment.

Electrode assembly 50 is a wound-type one. Electrode assembly 50 includes a positive electrode plate 10, a separator 30, and a negative electrode plate 20. In other words, battery 100 includes positive electrode plate 10, negative electrode plate 20, and the electrolyte solution. Each of positive electrode plate 10, separator 30, and negative electrode plate 20 is a belt-shaped sheet. Electrode assembly 50 may include a plurality of separators 30. Electrode assembly 50 is formed by stacking positive electrode plate 10, separator 30, and negative electrode plate 20 in this order and then winding them spirally. One of positive electrode plate 10 and negative electrode plate 20 may be interposed between separators 30. Both positive electrode plate 10 and negative electrode plate 20 may be interposed between separators 30. After the winding, electrode assembly 50 is shaped into a flat form. The wound-type one is merely an example. Electrode assembly 50 may be a stack-type one, for example.

<<Positive Electrode Plate>>

Positive electrode plate 10 may include a positive electrode substrate 11 and a positive electrode active material layer 12, for example. Positive electrode substrate 11 is a conductive sheet. Positive electrode substrate 11 may be an Al alloy foil and/or the like, for example. The "thickness" of each member herein may be measured with a constant-pressure thickness-measuring instrument (a thickness gauge). Positive electrode substrate 11 may have a thickness from 10 μm to 30 μm, for example. Positive electrode active material layer 12 may be placed on a surface of positive electrode substrate 11. For example, positive electrode active material layer 12 may be placed on only one side of positive electrode substrate 11. For example, positive electrode active material layer 12 may be placed on both sides of positive electrode substrate 11. From one end in a width direction (in the X-axis direction in FIG. 2) of positive electrode plate 10, positive electrode substrate 11 may be exposed. To the exposed portion of positive electrode substrate 11, positive electrode current-collecting member 71 may be bonded.

Positive electrode active material layer 12 may have a thickness from 10 μm to 200 μm, for example. Positive electrode active material layer 12 includes positive electrode active material particles. That is, positive electrode plate 10 includes positive electrode active material particles. The positive electrode active material particles may include an optional component. The positive electrode active material particles may include, for example, at least one selected from the group consisting of $LiCoO_2$, $LiNiO_2$, $LiMnO_2$, $LiMn_2O_4$, $Li(NiCoMn)O_2$, $Li(NiCoAl)O_2$, and $LiFePO_4$.

Here, the expression "(NiCoMn)" in the composition formula "$Li(NiCoMn)O_2$", for example, means that the constituents within the parentheses are collectively regarded as a single unit in the entire composition ratio. In addition to the positive electrode active material particles, positive electrode active material layer 12 may further include a conductive material, a binder, and the like. The conductive material may include an optional component. The conductive material may include acetylene black and/or the like, for example. The amount of the conductive material may be, for example, from 0.1 parts by mass to 10 parts by mass relative to 100 parts by mass of the positive electrode active material particles. The binder may include an optional component. The binder may include polyvinylidene difluoride (PVdF) and/or the like, for example. The amount of the binder may be, for example, from 0.1 parts by mass to 10 parts by mass relative to 100 parts by mass of the positive electrode active material particles.

The positive electrode active material particles may have a D50 from 1 μm to 30 μm, for example. The "D50" herein refers to a particle size in volume-based particle size distribution at which the cumulative particle volume (accumulated from the side of small sizes) reaches 50% of the total particle volume. The volume-based particle size distribution may be obtained through measurement with a laser-diffraction particle size distribution analyzer.

The positive electrode active material particles may have a BET specific surface area from 1 $m^2/g$ to 10 $m^2/g$, for example. The "BET specific surface area" herein refers to a specific surface area calculated, by a BET multi-point method, in an absorption isotherm obtained through measurement by a gas adsorption method. The adsorbate gas is nitrogen gas. For a single target of measurement, the BET specific surface area is measured three times or more. The arithmetic mean of the three or more measurements is regarded as the BET specific surface area of the target of measurement.

<<Negative Electrode Plate>>

Negative electrode plate 20 may include a negative electrode substrate 21 and a negative electrode active material layer 22, for example. Negative electrode substrate 21 is a conductive sheet. Negative electrode substrate 21 may be a Cu (copper) alloy foil and/or the like, for example. Negative electrode substrate 21 may have a thickness from 5 μm to 30 μm, for example. Negative electrode active material layer 22 may be placed on a surface of negative electrode substrate 21. Negative electrode active material layer 22 may be placed on only one side of negative electrode substrate 21, for example. Negative electrode active material layer 22 may be placed on both sides of negative electrode substrate 21, for example. From one end in a width direction (in the X-axis direction in FIG. 2) of negative electrode plate 20, negative electrode substrate 21 may be exposed. To the exposed portion of negative electrode substrate 21, negative electrode current-collecting member 72 may be bonded.

Negative electrode active material layer 22 may have a thickness from 10 μm to 200 μm, for example. Negative electrode active material layer 22 includes negative electrode active material particles. That is, negative electrode plate 20 includes negative electrode active material particles. The negative electrode active material particles may include an optional component. The negative electrode active material particles may include, for example, at least one selected from the group consisting of graphite, soft carbon, hard carbon, SiO, and metal Si. The negative electrode active material particles may consist essentially of spheronized graphite particles, for example. The spheronized graphite particles may be covered with a pitch-based carbon material and/or the like, for example.

Negative electrode active material layer 22 may further include a conductive material, a binder, and the like, in addition to the negative electrode active material particles. The conductive material may include an optional component. The conductive material may include carbon nanotubes and/or the like, for example. The amount of the conductive material may be, for example, from 0.1 parts by mass to 10 parts by mass relative to 100 parts by mass of the negative electrode active material particles. The binder may include an optional component. The binder may include, for example, at least one selected from the group consisting of carboxymethylcellulose (CMC) and styrene-butadiene rubber (SBR). The amount of the binder may be, for example, from 0.1 parts by mass to 10 parts by mass relative to 100 parts by mass of the negative electrode active material particles.

The negative electrode active material particles may have a D50 from 1 μm to 30 μm, for example. The negative electrode active material particles may have a BET specific surface area from 1 m$^2$/g to 10 m$^2$/g, for example.

<<Average Circularity>>

The negative electrode active material particles have an average circularity more than 0.7. The negative electrode active material particles may have an average circularity from 0.72 to 1, for example. The negative electrode active material particles may have an average circularity from 0.72 to 0.9, for example. The negative electrode active material particles may have an average circularity from 0.72 to 0.85, for example. The negative electrode active material particles may have an average circularity from 0.72 to 0.8, for example.

Figure 3:
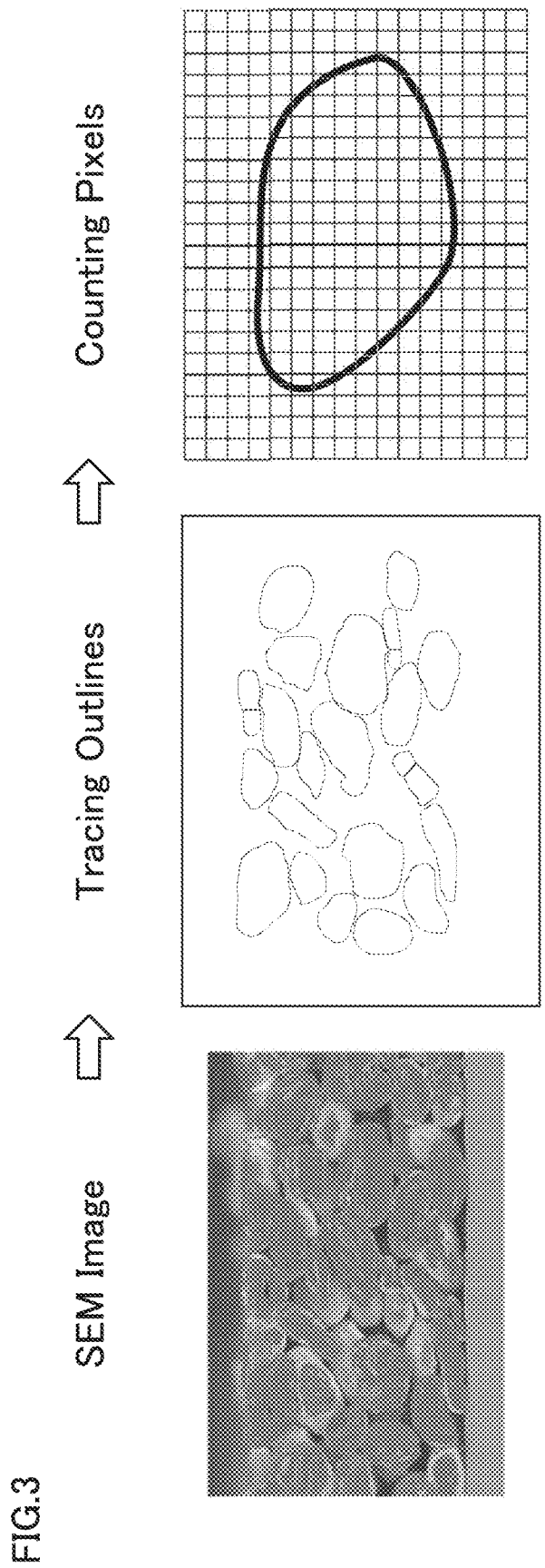
FIG. 3 illustrates a method for measuring circularity.

FIG. 3 illustrates a method for measuring circularity.

The "average circularity" herein is measured in a cross section of negative electrode plate 20. Negative electrode plate 20 is cut to prepare a cross-sectional sample. The cross-sectional sample includes a cut face perpendicular to a surface of negative electrode plate 20. From negative electrode plate 20, five cross-sectional samples are prepared. The position where each cross-sectional sample is cut is randomly selected from the entire negative electrode plate 20.

The cut face of the cross-sectional sample is cleaned. For example, CP (Cross section Polisher) treatment, FIB (Focused Ion Beam) treatment, and/or the like may be performed. After cleaning, part of the cross-sectional sample is observed with an SEM (Scanning Electron Microscope). The SEM magnification is adjusted in such a way that 10 to 50 negative electrode active material particles, for example, are included within an image. In this way, an SEM image is acquired. An SEM image is acquired from each cross-sectional sample; that is, five SEM images are prepared.

In the SEM image, the outline of each negative electrode active material particle is traced. Pixels contained within the region surrounded by the outline are counted. From the total number of pixels within the region, the area of the negative electrode active material particle (S) is calculated. Also, pixels crossed by the outline are counted. From the total number of pixels crossed by the outline, the perimeter of the negative electrode active material particle (L) is calculated. For the outline tracing and pixel counting, image analysis software may be used. By the expression "Circularity=$4\pi S/L^2$", the circularity of individual negative electrode active material particles is calculated. When the circularity is 1, it is considered that the cross section of the negative electrode active material particle is a perfect circle. For each of the five or more SEM images, the circularity of individual negative electrode active material particles is measured. That is, the circularity of 50 to 250 negative electrode active material particles is measured. The arithmetic mean of these 50 to 250 circularity values is regarded as the average circularity.

<<Method for Adjusting Average Circularity>>

When the circularity of the negative electrode active material particles in a raw material step (before production of negative electrode plate 20) is high, for example, the average circularity in negative electrode plate 20 may also be high. For example, the negative electrode active material particles (powder) may be subjected to spheronization treatment. For example, in an airstream, mechanical action such as compression and/or shearing may be applied to the negative electrode active material particles so as to make the contours of the negative electrode active material particles closer to spherical. For example, tumbling granulation and/or the like may be carried out to granulate fine particles (primary particles) into near-spherical secondary particles. In order to adjust the aggregation force of the primary particles, a binder and/or the like may be used. The negative electrode active material particles in a raw material step may have an average circularity from 0.7 to 1, for example. The average circularity of the negative electrode active material particles in a raw material step may be measured in an SEM image of the powder.

For example, the average circularity may be adjusted by the linear pressure applied at the time of roll pressing. Usually, negative electrode plate 20 is compressed by roll pressing during its production. The higher the linear pressure by roll pressing is, the lower the average circularity tends to become. It may be because the negative electrode active material particles become oriented and deformed. The more spherical the negative electrode active material particles are, the more facilitated the filling of the negative electrode active material particles tends to be at the time of roll pressing. Using spheronized negative electrode active material particles makes it possible to achieve adjustment to a desired packing density at a low linear pressure. As a result, the average circularity after roll pressing is expected to be high.

When the negative electrode active material particles are soft, the average circularity tends to decrease. It may be because the negative electrode active material particles tend to be deformed at the time of roll pressing. For example, when the negative electrode active material particles have a high particle strength (hardness), the average circularity after roll pressing is expected to be high. For example, the surface of the negative electrode active material particles may be covered with a pitch-based carbon material. By this, the particle strength is expected to be enhanced. The negative electrode active material particles may have a particle strength from 50 MPa to 70 MPa, for example. The particle strength may be measured by a compression destruction test of the particles. The compression destruction test may be carried out with a micro-compression tester.

When the porosity of the negative electrode active material particles is high, the average circularity tends to decrease. It may be because the negative electrode active material particles tend to be deformed at the time of roll pressing. For example, when the negative electrode active material particles have a low porosity, the average circularity after roll pressing is expected to be high. The negative electrode active material particles may have a porosity from 1% to 30%, for example. The porosity of the negative electrode active material particles may be measured with a mercury porosimeter.

In the present embodiment, all of "the average circularity of the negative electrode active material particles (in a raw material step)", "the particle strength of the negative electrode active material particles", and "the porosity of the negative electrode active material particles" are considered holistically and, thereby, the linear pressure to be applied at the time of roll pressing is determined so as to make the average circularity in the negative electrode plate become more than 0.7.

<<Electrolyte Solution>>

The electrolyte solution includes a solvent and a supporting electrolyte. The solvent is aprotic. The solvent may include an optional component. The solvent may include, for example, at least one selected from the group consisting of ethylene carbonate (EC), propylene carbonate (PC), butylene carbonate (BC), dimethyl carbonate (DMC), ethyl methyl carbonate (EMC), diethyl carbonate (DEC), 1,2-dimethoxyethane (DME), methyl formate (MF), methyl acetate (MA), methyl propionate (MP), and γ-butyrolactone (GBL).

The supporting electrolyte is dissolved in the solvent. The supporting electrolyte may include, for example, at least one selected from the group consisting of $LiPF_6$, $LiBF_4$, and $LiN(FSO_2)_2$. The supporting electrolyte may have a molarity from 0.5 mol/L to 2.0 mol/L, for example. The supporting electrolyte may have a molarity from 0.8 mol/L to 1.2 mol/L, for example.

The electrolyte solution includes $FSO_3Li$, in addition to the solvent and the supporting electrolyte. As long as it includes $FSO_3Li$, the electrolyte solution may further include an optional additive. The electrolyte solution may include, for example, at least one selected from the group consisting of vinylene carbonate (VC), vinylethylene carbonate (VEC), fluoroethylene carbonate (FEC), ethylene sulfite (ES), propane sultone (PS), ethylene sulfate (DTD), a nitrile compound [typical examples include adiponitrile (AdpCN) and succinonitrile (ScCN)], dioxane (DOX), cyclohexylbenzene (CHB), biphenyl (BP), lithium difluorophosphate ($LiPO_2F_2$), lithium difluorobis(oxalato)phosphate (LiDFOP), lithium difluorooxalatoborate (LiDFOB), and lithium bis(oxalato)borate (LiBOB).

<<Value A>>

The amount of $FSO_3Li$ to be added (the initial content) is determined so as to achieve a value A [$=x-(0.0061y+0.0212z)$] of −0.19 or more. By this, post-high-temperature-storage capacity retention is expected to be improved. The higher the value A is, the higher the post-high-temperature-storage capacity retention tends to be. For example, the value A may be 0.04 or more, or may be 0.11 or more, or may be 0.19 or more, or may be 0.34 or more. For example, the value A may be 0.58 or less. By this, DCIR is expected to be lowered, for example. The value A is significant to two decimal place. It is rounded to two decimal place.

The "x [μmol/Ah]" used for the value A calculation is a value obtained by dividing the total amount [mol] of substance of $FSO_3Li$ included in the electrolyte solution by the rated capacity [Ah] of battery 100. The total amount [mol] of substance of $FSO_3Li$ is the product of the molality [mol/kg] of $FSO_3Li$ in the electrolyte solution and the mass [kg] of the electrolyte solution.

The "y [m²/Ah]" used for the value A calculation is a value obtained by dividing the product of the BET specific surface area [m²/g] of the positive electrode active material particles and the total mass [g] of the positive electrode active material particles included in positive electrode plate 10, by the rated capacity [Ah] of battery 100. The total mass [g] of the positive electrode active material particles is the product of the mass [g] of positive electrode active material layer 12 (a positive electrode composite material) and the mass fraction [g/g] of the positive electrode active material particles in positive electrode active material layer 12.

The "z [m²/Ah]" used for the value A calculation is a value obtained by dividing the product of the BET specific surface area [m²/g] of the negative electrode active material particles and the total mass [g] of the negative electrode active material particles included in negative electrode plate 20, by the rated capacity [Ah] of battery 100. The total mass [g] of the negative electrode active material particles is the product of the mass [g] of negative electrode active material layer 22 (a negative electrode composite material) and the mass fraction [g/g] of the negative electrode active material particles in negative electrode active material layer 22.

<<Separator>>

At least part of separator 30 is interposed between positive electrode plate 10 and negative electrode plate 20. Separator 30 separates positive electrode plate 10 from negative electrode plate 20. Separator 30 may have a thickness from 10 μm to 30 μm, for example.

Separator 30 is a porous sheet. Separator 30 allows for permeation of the electrolyte solution therethrough. Separator 30 may have an air permeability from 200 s/100 mL to 400 s/100 mL, for example. The "air permeability" herein refers to the "Air Resistance" defined in "JIS P8117:2009". The air permeability is measured by a Gurley test method.

Separator 30 is electrically insulating. Separator 30 may include a polyolefin-based resin, for example. Separator 30 may consist essentially of a polyolefin-based resin, for example. The polyolefin-based resin may include, for example, at least one selected from the group consisting of polyethylene (PE) and polypropylene (PP). Separator 30 may have a monolayer structure, for example. Separator 30 may consist essentially of a PE layer, for example. Separator 30 may have a multilayer structure, for example. Separator 30 may be formed by, for example, stacking a PP layer, a PE layer, and a PP layer in this order. On a surface of separator 30, a heat-resistant layer and/or the like may be formed, for example.

Examples

Next, examples according to the present technique (hereinafter also called "the present example") will be described. It should be noted that the below description does not limit the scope of the present technique.

<Fabrication of Non-Aqueous Electrolyte Secondary Battery>

By the procedure described below, test batteries (non-aqueous electrolyte secondary batteries) according to No. 1 to No. 11 were fabricated.

<<Preparation of Positive Electrode Plate>>

The below materials were prepared.

Positive electrode active material particles: Li(NiCoMn)$O_2$
Conductive material: acetylene black
Binder: PVdF
Dispersion medium: N-methyl-2-pyrrolidone
Positive electrode substrate: Al alloy foil The positive electrode active material particles, the conductive material, the binder, and the dispersion medium were mixed to prepare a positive electrode slurry. The positive electrode slurry was applied to a surface of the positive electrode substrate, followed by drying, and thereby a positive electrode active material layer was formed. The positive electrode active material layer was compressed to produce a positive electrode raw sheet. The positive electrode raw sheet was cut into a predetermined size to prepare a positive electrode plate. The planar shape of the positive electrode plate was a belt-like shape.

In the present example, so as to obtain the values shown in the column "y" in Table 1 below, the BET specific surface area of the positive electrode active material particles, the amount of the positive electrode slurry to apply, and the like were adjusted.

<<Preparation of Negative Electrode Plate>>

The below materials were prepared.

Negative electrode active material particles: natural graphite
Binder: CMC, SBR
Dispersion medium: water
Negative electrode substrate: Cu alloy foil The negative electrode active material particles, the binder, and the dispersion medium were mixed to prepare a negative electrode slurry. The negative electrode slurry was applied to a surface of the negative electrode substrate, followed by drying, and thereby a negative electrode active material layer was formed. The negative electrode active material layer was compressed to produce a negative electrode raw sheet. The negative electrode raw sheet was cut into a predetermined size to prepare a negative electrode plate. The planar shape of the negative electrode plate was a belt-like shape.

In the present example, so as to obtain the values shown in the column "z" in Table 1 below, the BET specific surface area of the negative electrode active material particles, the amount of the negative electrode slurry to apply, and the like were adjusted. Moreover, so as to obtain the values shown in the column "Average circularity" in Table 1 below, the conditions for compression of the negative electrode active material layer and the like were adjusted.

<<Assembly>>

A separator was prepared. The separator was a porous sheet made of a polyolefin-based resin. The separator, the positive electrode plate, the separator, and the negative electrode plate were stacked in this order to form a stacked body. The stacked body was wound spirally to form a cylindrical electrode assembly. The electrode assembly was shaped into a flat form.

A housing was prepared. The housing was prismatic. The electrode assembly was connected to a positive electrode terminal and a negative electrode terminal. The electrode assembly was placed in the housing.

<<Injection of Electrolyte Solution>>

An electrolyte solution was prepared. The electrolyte solution consisted of the below components.

Solvent: EC/EMC/DMC=3/3/4 (volume ratio)
Supporting electrolyte: $LiPF_6$ (molarity, 1 mol/L)
Additives: VC (mass concentration, 0.3%), $FSO_3Li$ In the present example, so as to obtain the values shown in the column "Value A" in Table 1 below, the molality of $FSO_3Li$ was adjusted.

The electrolyte solution was injected into the housing. The electrode assembly was impregnated with the electrolyte solution. Thus, a test battery was fabricated. After impregnation with the electrolyte solution, a predetermined capacity was charged to the test battery. Gas generated by the charging was released out of the housing. After charging, the housing was hermetically sealed.

<Evaluation>

<<High-Temperature Storage Test>>

The test battery was discharged from 4.15 V to 3 V to measure the pre-storage capacity ($Q_0$). The SOC (State Of Charge) of the test battery was adjusted to 80%. In a thermostatic chamber set at 75° C., the test battery was stored for 60 days. On the 7th, 14th, and 28th days from the start of the storage, the test battery was additionally charged. The capacity charged by the additional charging was equivalent to the capacity lost by self-discharge during high-temperature storage. After a lapse of 60 days, under the same conditions as those for the pre-storage capacity ($Q_0$), post-storage capacity ($Q_1$) was measured. Capacity retention was calculated by the following expression: Capacity retention [%]=($Q_1/Q_0$)×100. In the present example, when the capacity retention is 82.1% or more, it is considered that the post-high-temperature-storage capacity retention has been improved.

<<DCIR>>

The SOC of the test battery was adjusted to 50%. The open circuit voltage (OCV) at 50% SOC was measured. In an environment at a temperature of 25° C., at a current (I) of 150 A, the test battery was discharged for 10 seconds. The difference ($\Delta V$) between the terminal voltage after the 10-second discharging and the OCV at 50% SOC was calculated. DCIR was calculated by the following expression: DCIR=$\Delta V/I$. The value shown in the column "DCIR" in Table 1 below is a relative value. In the present example, DCIR of No. 1 is defined as 100.

TABLE 1

| No. | Rated capacity [Ah] | Electrolyte solution x[1] [μmol/Ah] | Positive electrode plate y[2] [m²/Ah] | Negative electrode plate z[3] [m²/Ah] | Value A[4] [μmol/Ah] | Negative electrode active material particles Average circularity [—] | High-temperature storage test[5] Capacity retention [%] | DCIR[6] [—] |
|---|---|---|---|---|---|---|---|---|
| 1 | 4.0 | 0.94 | 19 | 34 | 0.11 | 0.72 | 84.1 | 100 |
| 2 | 4.0 | 1.18 | 19 | 34 | 0.34 | 0.72 | 85.8 | 99 |
| 3 | 4.0 | 0.94 | 18 | 26 | 0.28 | 0.72 | 85.5 | |
| 4 | 4.0 | 0.71 | 18 | 26 | 0.04 | 0.72 | 84.3 | |
| 5 | 4.0 | 1.41 | 19 | 34 | 0.58 | 0.72 | 85.2 | 102 |
| 6 | 4.0 | 0.47 | 18 | 26 | −0.19 | 0.72 | 82.1 | |
| 7 | 4.2 | 0.25 | 10 | 32 | −0.49 | 0.72 | 74.0 | |
| 8 | 4.2 | 0.99 | 25 | 32 | 0.16 | 0.53 | 81.0 | |

TABLE 1-continued

| No. | Rated capacity [Ah] | Electrolyte solution x[1] [μmol/Ah] | Positive electrode plate y[2] [m²/Ah] | Negative electrode plate z[3] [m²/Ah] | Value A[4] [μmol/Ah] | Negative electrode active material particles Average circularity [—] | High-temperature storage test[5] Capacity retention [%] | DCIR[6] [—] |
|---|---|---|---|---|---|---|---|---|
| 9 | 4.2 | 0.49 | 10 | 31 | −0.22 | 0.53 | 77.8 | |
| 10 | 4.2 | 0.25 | 10 | 31 | −0.47 | 0.53 | 73.9 | |
| 11 | 4.2 | 0 | 11 | 30 | −0.70 | 0.53 | 60.0 | |

[1]x = (Total amount of substance of FSO$_3$Li included in electrolyte solution)/(rated capacity)
[2]y = {(BET specific surface area of positive electrode active material particles)*(total mass of positive electrode active material particles included in positive electrode plate)}/(rated capacity)
[3]z = {(BET specific surface area of negative electrode active material particles)*(total mass of negative electrode active material particles included in negative electrode plate)}/(rated capacity)
[4]Value A = x − (0.0061y + 300.0212z)
[5]Storage temperature was 75° C., and storage duration was 60 days. During storage, additional charging was performed.
[6]DCIR of No. 1 is defined as 100.

<Results>

Figure 4:
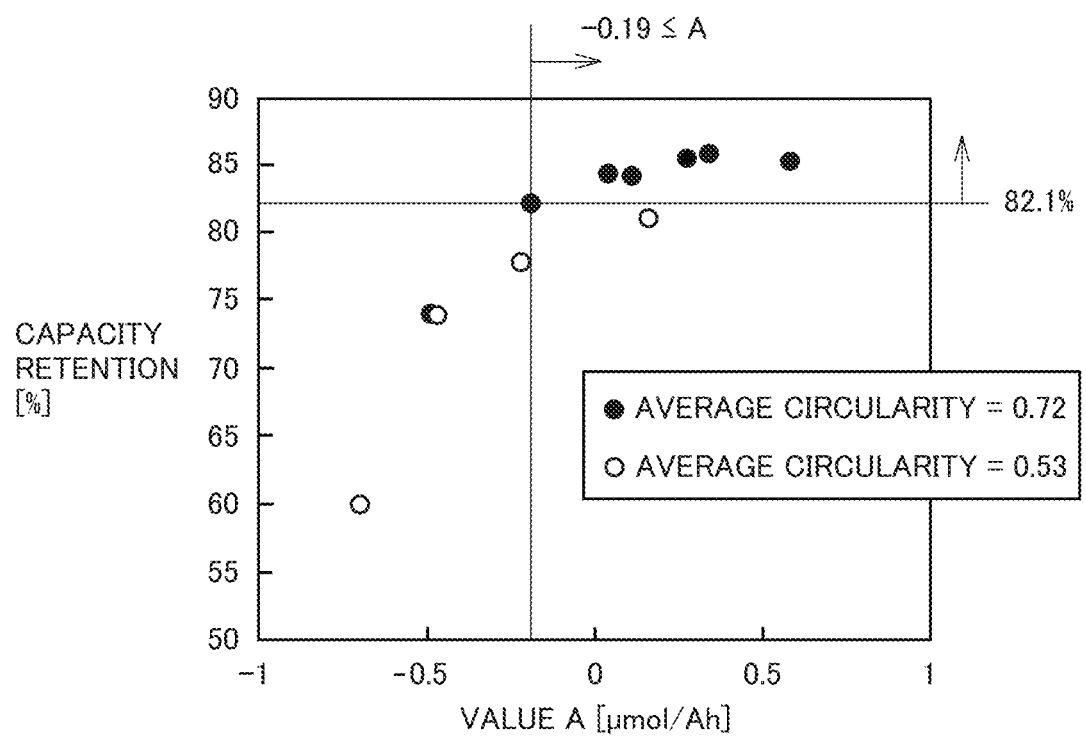
FIG. 4 is a graph illustrating a relationship between post-high-temperature-storage capacity retention and value A.

FIG. 4 is a graph illustrating a relationship between post-high-temperature-storage capacity retention and value A.

The higher the value A is, the more enhanced the capacity retention tends to be. When the average circularity of the negative electrode active material particles is more than 0.7 and the value A is −0.19 or more, a capacity retention of 82.1% or more is obtained.

When the value A exceeds zero, capacity retention tends to be saturated. When the value A increases to 0.58, DCIR tends to increase (No. 5 in Table 1 above). If the value A exceeds 0.58, DCIR can increase to a non-negligible extent.

When the average circularity of the negative electrode active material particles is 0.7 or less, the increase in capacity retention along with the increase in the value A is moderate. When the average circularity of the negative electrode active material particles is 0.7 or less, a capacity retention of 82.1% or more is not obtained even when the value A is −0.19 or more.

The present embodiment and the present example are illustrative in any respect. The present embodiment and the present example are non-restrictive. The scope of the present technique encompasses any modifications within the meaning and the scope equivalent to the terms of the claims. For example, it is expected that certain configurations of the present embodiments and the present examples can be optionally combined. In the case where a plurality of functions and effects are described in the present embodiment and the present example, the scope of the present technique is not limited to the scope where all these functions and effects are obtained.

What is claimed is:

1. A non-aqueous electrolyte secondary battery having a rated capacity, comprising:
   a positive electrode plate;
   a negative electrode plate; and
   an electrolyte solution, wherein
      the positive electrode plate includes positive electrode active material particles, and the positive electrode active material particles have a BET specific surface area ranging from 1 m²/g to 10 m²/g,
   the negative electrode plate includes negative electrode active material particles, the negative electrode active material particles have a BET specific surface area ranging from 1 m²/g to 10 m²/g, and the negative electrode active material particles included at least one selected from the group consisting of graphite, soft carbon and hard carbon,
   the negative electrode active material particles have an average circularity more than 0.7,
   the electrolyte solution includes lithium fluorosulfonate, and
   a relationship of an expression (I):

$$0.04 \leq x - (0.0061y + 0.0212z) \leq 0.58 \quad (I)$$

is satisfied,
where
   x [μmol/Ah] is a value obtained by dividing a total amount of substance of lithium fluorosulfonate included in the electrolyte solution, by the rated capacity;
   y [m²/Ah] is a value obtained by dividing a product of a BET specific surface area of the positive electrode active material particles and the total mass of the positive electrode active material particles included in the positive electrode plate, by the rated capacity; and
   z [m²/Ah] is a value obtained by dividing a product of a BET specific surface area of the negative electrode active material particles and the total mass of the negative electrode active material particles included in the negative electrode plate, by the rated capacity,
wherein the non-aqueous electrolyte secondary battery has a rated capacity ranging from 3 Ah to 5 Ah.

2. The non-aqueous electrolyte secondary battery according to claim 1, wherein a relationship of an expression (II):

$$x - (0.0061y + 0.0212z) \leq 0.58 \quad (II)$$

is further satisfied.

* * * * *